United States Patent Office 3,274,139
Patented Sept. 20, 1966

3,274,139
HIGHLY REACTIVE ALKALINE PHENOL-FORMALDEHYDE CONDENSATES
Alan L. Lambuth, Bellevue, Wash., assignor to Monsanto Company, a corporation of Delaware
No Drawing. Filed June 27, 1963, Ser. No. 290,907
8 Claims. (Cl. 260—29.3)

This invention is a continuation-in-part of that claimed copending application S. N. 35,442, filed June 13, 1960, and now abandoned, and relates to condensation products particularly suitable for use in the preparation of adhesives. More particularly, the invention relates to highly reactive aqueous alkaline condensation products of a phenol, formaldehyde and an alkali metal hydroxide.

Aqueous alkaline phenol-formaldehyde condensates are commonly employed in the manufacture of adhesives for use in the preparation of plywood, laminated wood, hardwood, chipboard, etc., where rigid standards, e.g., of moisture resistance and mold resistance must be met. However, the presently available aqueous alkaline phenolic adhesives cannot be cured as rapidly as can protein adhesives and, thus, cannot compete economically with the latter in applications where moisture resistance or mold resistance are not of significant importance.

The reasons for the slowness of cure of phenol-formaldehyde condensates are not entirely clear. However, there are at least four competing reactions which may occur during the condensation of phenol with formaldehyde. One reaction is the necessary formation of methylol phenols, the basic units of resin synthesis. A second reaction is the desired condensation of these methylol phenols to yield resin structure. A third reaction is Cannizzaro reaction which converts formaldehyde to formic acid and methanol, thus interfering with methylolation and polymer growth. A fourth reaction is Aldol condensation of the formaldehyde with itself, forming a series of complex sugar-like products. This last reaction not only interferes with the desired phenolic condensation by removing formaldehyde from the reaction system but also slows polymer growth by chain termination and plasticizing effects.

One object of this invention is to provide aqueous alkaline phenol-formaldehyde condensates having high reactivity when used in adhesive compositions.

A further object is to provide a process for the preparation of such highly reactive aqueous alkaline phenol-formaldehyde condensates.

It has been found that these and other objects may be attained by regulating the ratio of phenol to formaldehyde to alkali metal hydroxide in such a manner that the Cannizzaro reaction is substantially entirely suppressed and the Aldol condensation is suppressed until the desired phenol-formaldehyde condensation is nearly complete. At that point, the Aldol condensation is deliberately accelerated.

The following examples are given in illustration of the invention and are not intended as limitations thereon. Where parts are mentioned, they are parts by weight. Examples I–XIII present the preparation of several typical highly reactive aqueous alkaline phenol-formaldehyde condensates at varying molar ratios of the primary components and under varying temperature and viscosity end-point conditions. Example XIV illustrates the deficiencies with respect to reactivity of the conventional aqueous alkaline phenol-formaldehyde condensates known to the art.

In all of the following examples a jacketed stainless steel kettle is used equipped with heating and cooling means for the jacket, an agitator, a reflux condenser and means for applying a vacuum.

Example I

| Ingredients | Parts | Approx. Molar Proportion |
|---|---|---|
| Phenol | 325 | 1.0 |
| 37% Formalin containing about 1% methanol by weight | 705 | 2.5 |
| Water | 460 | |
| First 50% aqueous NaOH solution | 105 | 0.375 |
| Second 50% aqueous NaOH solution | 85 | 0.30 |
| Third 50% aqueous NaOH solution | 120 | 0.425 |
| | 1,800 | |

The phenol, Formalin, water and first caustic are charged to the reactor and the mixture is heated gently until an exothermic reaction starts which rapidly carries the reaction temperature to reflux (ca. 215° F.). After cooking at reflux for about 30 minutes, the mixture is cooled to 160° F. and maintained substantially thereat until a 70° F. viscosity of about 7200 MacMichael #26d units is attained. The second caustic is then added and the mixture is maintained at about 160° F. until a 70° F. viscosity of about 65 MacMichael #26d units is attained. The third caustic is then added and the mixture is heated at about 180° F. until a 70° F. viscosity of about 55 MacMichael #26d units is attained. At this point, the mixture is rapidly cooled to about room temperature by refluxing under vacuum while passing cooling water through the jacket. The resin obtained has a 180° F. gel time of about 1700 seconds.

Example II

| Ingredients | Parts | Approx. Molar Proportion |
|---|---|---|
| Phenol | 325 | 1.0 |
| 37% Formalin containing about 1% methanol by weight | 705 | 2.5 |
| Water | 460 | |
| First 50% aqueous NaOH solution | 100 | 0.35 |
| Second 50% aqueous NaOH solution | 100 | 0.35 |
| Third 50% aqueous NaOH solution | 155 | 0.55 |
| | 1,845 | |

The phenol, Formalin, water and first caustic are charged to the reactor and the mixture is heated gently until an exothermic reaction starts which rapidly carries the reaction temperature to reflux (ca. 215° F.). After cooking at reflux for about 30 minutes, the mixture is cooled to about 160° F. and maintained substantially thereat until a 70° F. viscosity of about 440 MacMichael #26d units is attained. The second caustic is then added and the mixture is maintained at about 160° F. until a 70° F. viscosity of about 145 MacMichael #26d units is attained. The third caustic is then added and the mixture is heated at about 180° F. until a 70° F. viscosity of about 55 MacMichael #26d units is attained (ca. 1 minute). At this point, the mixture is rapidly cooled to about room temperature by refluxing under vacuum while passing cooling water through the jacket. The resin obtained has a 180° F. gel time of about 1900 seconds.

Example III

| Ingredients | Parts | Approx. Molar Proportion |
|---|---|---|
| Phenol | 325 | 1.0 |
| 37% Formalin containing about 1% methanol by weight | 705 | 2.5 |
| Water | 460 | |
| First 50% aqueous NaOH solution | 110 | 0.40 |
| Second 50% aqueous NaOH solution | 70 | 0.25 |
| Third 50% aqueous NaOH solution | 125 | 0.45 |
| | 1,795 | |

The phenol, Formalin, water and first caustic are charged to the reactor and the mixture is heated gently until an exothermic reaction starts which rapidly carries the reaction temperature to reflux (ca. 215° F.). After cooking at reflux for about 30 minutes, the mixture is cooled to about 160° F. and maintained substantially thereat until a 70° F. viscosity of about 5,800 MacMichael #26d units is attained. The second caustic is then added and the mixture is maintained at about 160° F. until a 70° F. viscosity of about 60 MacMichael #26d units is attained. The third caustic is then added and the mixture is heated at about 180° F. until a 70° F. viscosity of about 55 MacMichael #26d units is attained (ca. 10 minutes). At this point, the mixture is rapidly cooled to about room temperature by refluxing under vacuum while passing cooling water through the jacket. The resin obtained has a 180° F. gel time of about 1950 seconds.

Example IV

| Ingredients | Parts | Approx. Molar Proportion |
|---|---|---|
| Phenol | 325 | 1.0 |
| 37% Formalin containing about 1% methanol by weight | 705 | 2.5 |
| Water | 450 | |
| First 50% aqueous NaOH solution | 110 | 0.40 |
| Second 50% aqueous NaOH solution | 70 | 0.25 |
| Third 50% aqueous NaOH solution | 180 | 0.65 |
| | 1,840 | |

The phenol, Formalin, water and first caustic are charged to the reactor and the mixture is heated gently until an exothermic reaction starts which rapidly carries the reaction temperature to reflux (ca. 215° F.). After cooking at reflux for about 30 minutes, the mixture is cooled to about 160° F. and maintained substantially thereat until a 70° F. viscosity of about 3,600 MacMichael #26d units is attained. The second caustic is then added and the mixture is maintained at about 160° F. until a 70° F. viscosity of about 135 MacMichael #26d units is attained. The third caustic is then added and the mixture is rapidly cooled to about room temperature by refluxing under vacuum while passing cooling water through the jacket. The resin obtained has a 180° F. gel time of about 1850 seconds.

Example V

| Ingredients | Parts | Approx. Molar Proportion |
|---|---|---|
| Phenol | 325 | 1.0 |
| 37% Formalin containing about 1% methanol by weight | 705 | 2.5 |
| Water | 460 | |
| First 50% aqueous NaOH solution | 110 | 0.40 |
| Second 50% aqueous NaOH solution | 85 | 0.30 |
| Third 50% aqueous NaOH solution | 110 | 0.40 |
| | 1,795 | |

The phenol, Formalin, water and first caustic are charged to the reactor and the mixture is heated gently until an exothermic reaction starts which rapidly carries the reaction temperature to reflux (ca. 215° F.). After cooking at reflux for about 30 minutes, the mixture is cooled to about 160° F. and maintained substantially thereat until a 70° F. viscosity of about 2,160 MacMichael #26d units is attained. The second caustic is then added and the mixture is maintained at about 160° F. until a 70° F. viscosity of about 70 MacMichael #26d units is attained. The third caustic is then added and the mixture is heated at about 190° F. until a 70° F. viscosity of about 75 MacMichael #26d units is attained (ca. 10 minutes). At this point, the mixture is rapidly cooled to about room temperature by refluxing under vacuum while passing cooling water through the jacket. The resin obtained has a 180° F. gel time of about 1560 seconds.

Example VI

| Ingredients | Parts | Approx. Molar Proportion |
|---|---|---|
| Phenol | 325 | 1.0 |
| 37% Formalin containing about 1% methanol by weight | 735 | 2.6 |
| Water | 440 | |
| First 50% aqueous NaOH solution | 110 | 0.40 |
| Second 50% aqueous NaOH solution | 85 | 0.30 |
| Third 50% aqueous NaOH solution | 110 | 0.40 |
| | 1,805 | |

The phenol, Formalin, water and first caustic are charged to the reactor and the mixture is heated gently until an exothermic reaction starts which rapidly carries the reaction temperature to reflux (ca. 215° F.). After cooking at reflux for about 30 minutes, the mixture is cooled to about 160° F. and maintained substantially thereat until a 70° F. viscosity of about 1440 MacMichael #26d units is attained. The second caustic is then added and the mixture is maintained at about 160° F. until a 70° F. viscosity of about 65 MacMichael #26d units is attained. The third caustic is then added and the mixture is heated at about 180° F. until a 70° F. viscosity of about 70 MacMichael #26d units is attained (ca. 5 minutes). At this point, the mixture is rapidly cooled to about room temperature by refluxing under vacuum while passing cooling water through the jacket. The resin obtained has a 180° F. gel time of about 1720 seconds.

Example VII

| Ingredients | Parts | Approx. Molar Proportion |
|---|---|---|
| Phenol | 325 | 1.0 |
| 37% Formalin containing about 1% methanol by weight | 775 | 2.75 |
| Water | 460 | |
| First 50% aqueous NaOH solution | 125 | 0.45 |
| Second 50% aqueous NaOH solution | 85 | 0.30 |
| Third 50% aqueous NaOH solution | 110 | 0.40 |
| | 1,880 | |

The phenol, Formalin, water and first caustic are charged to the reactor and the mixture is heated gently until an exothermic reaction starts which rapidly carries the reaction temperature to reflux (ca. 215° F.). After cooking at reflux for about 30 minutes, the mixture is cooled to about 160° F. and maintained substantially thereat until a 70° F. viscosity of about 2,100 MacMichael #26d units is attained. The second caustic is then added and the mixture is maintained at about 160° F. until a 70° F. viscosity of about 40 MacMichael #26d units is attained. The third caustic is then added and the mixture is heated at about 180° F. until a 70° F. viscosity of about 90 MacMichael #26d units is attained (ca. 10 minutes). At this point, the mixture is rapidly cooled to about room temperature by refluxing under vacuum while passing cooling water through the jacket. The resin obtained has a 180° F. gel time of about 1380 seconds.

*Example VIII*

| Ingredients | Parts | Approx. Molar Proportion |
|---|---|---|
| Phenol | 325 | 1.0 |
| 37% Formalin containing about 1% methanol by weight | 845 | 3.0 |
| Water | 420 | |
| First 50% aqueous NaOH solution | 140 | 0.50 |
| Second 50% aqueous NaOH solution | 70 | 0.25 |
| Third 50% aqueous NaOH solution | 280 | 1.00 |
| | 2,080 | |

The phenol, Formalin, water and first caustic are charged to the reactor and the mixture is heated gently until an exothermic reaction starts which rapidly carries the reaction temperature to reflux (ca. 215° F.). After cooking at reflux for about 30 minutes, the mixture is cooled to about 160° F. and maintained substantially thereat until a 70° F. viscosity of about 10,000 MacMichael #26d units is attained. The second caustic is then added and the mixture is maintained at about 140° F. until a 70° F. viscosity of about 105 MacMichael #26d units is attained. The third caustic is then added and the mixture is heated at about 180° F. until a 70° F. viscosity of about 50 MacMichael #26d units is attained (ca. 5 minutes). At this point, the mixture is rapidly cooled to about room temperature by refluxing under vacuum while passing cooling water through the jacket. The resin obtained has a 180° F. gel time of about 1950 seconds.

*Example IX*

| Ingredients | Parts | Approx. Molar Proportion |
|---|---|---|
| Phenol | 325 | 1.0 |
| 37% Formalin containing about 1% methanol by weight | 705 | 2.5 |
| Water | 460 | |
| First 50% aqueous NaOH solution | 105 | 0.375 |
| Second 50% aqueous NaOH solution | 85 | 0.30 |
| Third 50% aqueous NaOH solution | 120 | 0.425 |
| | 1,800 | |

The phenol, Formalin, water and first caustic are charged to the reactor and the mixture is heated gently until an exothermic reaction starts which rapidly carries the reaction temperature to reflux (ca. 215° F.). After cooking at reflux for about 30 minutes, the mixture is cooled to about 160° F. and maintained substantially thereat until a 70° F. viscosity of about 36,000 MacMichael #26d units is attained. The second caustic is then added and the mixture is maintained at about 160° F. until a 70° F. viscosity of about 80 MacMichael #26d units is attained. The third caustic is then added and the mixture is rapidly cooled to about room temperature by refluxing under vacuum while passing cooling water through the jacket. The resin obtained has a 180° F. gel time of about 1790 seconds.

*Example X*

| Ingredients | Parts | Approx. Molar Proportion |
|---|---|---|
| Phenol | 325 | 1.0 |
| 37% Formalin containing about 1% methanol by weight | 705 | 2.5 |
| Water | 450 | |
| First 50% aqueous NaOH solution | 110 | 0.4 |
| Second 50% aqueous NaOH solution | 55 | 0.2 |
| Third 50% aqueous NaOH solution | 55 | 0.2 |
| Fourth 50% aqueous NaOH solution | 85 | 0.3 |
| | 1,785 | |

The phenol, Formalin, water and first caustic are charged to the reactor and the mixture is heated gently until an exothermic reaction starts which rapidly carries the reaction temperature to reflux (ca. 215° F.). After cooking at reflux for about 30 minutes, the mixture is cooled to about 180° F. and maintained substantially thereat until a 70° F. viscosity of about 105 MacMichael #26d units is attained. The second caustic is then added and the mixture is maintained at about 160° F. until a 70° F. viscosity of about 70 MacMichael #26d units is attained. The third caustic is then added and the mixture is heated at about 160° F. until a 70° F. viscosity of about 55 MacMichael #26d units is attained. The fourth caustic is then added and the mixture is then heated at about 190° F. until a 70° F. viscosity of about 55 MacMichael #26d units is attained (ca. 3 minutes). At this point, the mixture is rapidly cooled to about room temperature by refluxing under vacuum while passing cooling water through the jacket. The resin obtained has a 180° F. gel time of about 1620 seconds.

*Example XI*

| Ingredients | Parts | Approx. Molar Proportion |
|---|---|---|
| Phenol | 325 | 1.0 |
| 37% Formalin containing about 1% methanol by weight | 705 | 2.5 |
| Water | 440 | |
| First 50% aqueous NaOH solution | 110 | 0.40 |
| Second 50% aqueous NaOH | 85 | 0.30 |
| Third 50% aqueous NaOH solution | 110 | 0.40 |
| | 1,775 | |

The phenol, Formalin, water and first caustic are charged to the reactor and the mixture is heated gently until an exothermic reaction starts which rapidly carries the reaction temperature to reflux (ca. 215° F.). After cooking at reflux for about 30 minutes, the mixture is cooled to about 160° F. and maintained substantially thereat until a 70° F. viscosity of about 180 MacMichael #26d units is attained. The second caustic is then added and the mixture is maintained at about 160° F. until 70° F. viscosity of about 100 MacMichael #26d units is attained. The third caustic is then added and the mixture is heated at about 185° F. until a 70° F. viscosity of about 45 MacMichael #26d units is attained. At this point, the mixture is rapidly cooled to about room temperature by refluxing under vacuum while passing cooling water through the jacket. The resin obtained has a 180° F. gel time of about 1860 seconds.

Example XII

| Ingredients | Parts | Approx. Molar Proportion |
|---|---|---|
| Phenol | 325 | 1.0 |
| 37% Formalin containing about 1% methanol by weight | 705 | 2.5 |
| Water | 460 | |
| First 50% aqueous NaOH solution | 110 | 0.40 |
| Second 50% aqueous NaOH solution | 70 | 0.25 |
| Third 50% aqueous NaOH solution | 125 | 0.45 |
| | 1,795 | |

The phenol, Formalin, water and first cautic are charged to the reactor and the mixture is heated gently until an exothermic reaction starts which rapidly carries the reaction temperature to reflux (ca. 215° F.). After cooking at reflux for about 30 minutes, the mixture is cooled to about 160° F. and maintained substantially thereat until a 70° F. viscosity of about 16,800 MacMichael #26d units is attained. The second caustic is then added and the mixture is maintained at about 160° F. until a 70° F. viscosity of about 185 MacMichael #26d units is attained. The third caustic is then added and the mixture is rapidly cooled to about room temperature by refluxing under vacuum while passing cooling water through the jacket. The resin obtained has a 180° F. gel time of about 1230 seconds.

Example XIII

| Ingredients | Parts | Approx. Molar Proportion |
|---|---|---|
| Phenol | 325 | 1.0 |
| 37% Formalin containing about 1% methanol by weight | 775 | 2.75 |
| Water | 430 | |
| First 50% aqueous NaOH solution | 100 | 0.35 |
| Second 50% aqueous NaOH solution | 100 | 0.35 |
| Third 50% aqueous NaOH solution | 155 | 0.55 |
| | 1,885 | |

The phenol, Formalin, water and first caustic are charged to the reactor and the mixture is heated gently until an exothermic reaction startes which rapidly carries the reaction temperature to reflux (ca. 215° F.). After cooking at reflux for about 30 minutes, the mixture is cooled to about 160° F. and maintained substantially thereat until a 70° F. viscosity of about 940 MacMichael #26d units is attained. The second caustic is then added and the mixture is maintained at about 160° F. until a 70° F. viscosity of about 45 MacMichael #26d units is attained. The third caustic is then added and the mixture is heated at about 185° F. until a 70° F. viscosity of about 115 MacMichael #26d units is attained (ca. 5 minutes). At this point, the mixture is rapidly cooled to about room temperature by refluxing under vacuum while passing cooling water through the jacket. The resin obtained has a 180° F. gel time of about 1300 seconds.

Example XIV

A series of conventional aqueous alkaline phenol-formaldehyde condensates of the types taught in U.S. Patents 2,437,981 and Re. 23,347 are similarly prepared using various proportions of phenol, formaldehyde and caustic soda. The caustic soda is added in increments, also of varying proportions. The specific formulations and the 180° F. gel times obtained are summarized in Table A, following:

TABLE A

| Ex. No. | Approximate Molar Proportions | | | | | Final Viscosity MacMichael #26d Units | 180° F. Gel Time (sec.) |
|---|---|---|---|---|---|---|---|
| | Phenol | Formald. | 1st NaOH | 2d NaOH | 3d NaOH | | |
| XIVa | 1 | 2.25 | 0.35 | 0.50 | | 40 | 6,000 |
| XIVb | 1 | 2.5 | 0.45 | 0.3 | | 48 | 3,850 |
| XIVc | 1 | 2.5 | 0.55 | 0.2 | 0.4 | Premature Cannizzaro | 2,700 |
| XIVd | 1 | 2.25 | 0.15 | 0.3 | 0.6 | 58 | 2,700 |
| XIVe | 1 | 1.5 | 0.35 | 0.5 | | 14 | 20,000 |

None of the conventional phenolic resins prepared in Example XIV and summarized in Table A develop the superior reactivity, as evidenced by 180° F. gel time, attained in the resins of Examples I–XIII. Each of these conventional phenolic resins meets many of the requirements hereinafter set forth for the highly reactive phenolic resins of this invention, but differ therefrom in one or more material aspects such as the proportion of initial and/or total alkali metal hydroxide or of formaldehyde, etc. These differences are sufficient to prevent the desired increase in reactivity.

The resin of Example XIVa conforms to the requirements of this invention with respect to the proportions of phenol to formaldehyde and first caustic. However, resin XIVa is deficient in the proportion of total caustic, i.e., it contains less than one mol of caustic per mol of phenol and thus is considerably less reactive than any of the resins of Examples I–XIII.

The resin of Example XIVb complies with the requirements of this invention with respect to the proportions of phenol, formaldehyde, first caustic and second caustic. However, this resin also contains less than the required minimum of one mol total caustic per mol of phenol and thus is also less reactive than any of the resins of Examples I–XIII. Note, however, that resin XIVb is more reactive than resin XIVa despite the fact that it contains less total caustic. This result, which is contrary to accepted theory, can be attributed in large part to the fact that the proportions of the first and second causic additions are controlled within the prescribed limits of this invention.

The resin of Example XIVc complies with the requirements of this invention with respect to the proportions of phenol to formaldehyde and total caustic. However, the proportion of first caustic employed exceeds the prescribed maximum for this invention of 20 mol percent based upon formaldehyde. As can be seen, this results in premature Cannizzaro reaction.

The resin of Example XIVd also complies with the requirements of this invention with respect to the proportions of phenol to formaldehyde and total caustic. However, in this resin the proportion of first caustic employed is less than the prescribed minimum for this invention of 12 mol percent based upon formaldehyde. Again it is evident that this resin has failed to develop full reactivity.

The resin of Example XIVe contains a deficiency both in formaldehyde and in total caustic when considered according to the requirements of this invention. As can be seen, the reactivity, as evidenced by a 180° F. gel time of about 20,000 seconds, is extremely poor.

The 180° F. gel time test provides a magnified scale enabling one to readily observe and accurately measure differences in resin reactivity. Correlating the 180° F. gel timer reported in these Examples to actual 285° F. press times in the preparation of $1\%_{16}''$ five ply Douglas fir plywood panels, the following relationship exists.

| 180° F. gel time, seconds | Press time, minutes |
|---|---|
| 20,000 | 11 |
| 7,000 | 9 |
| 4,000 | 7.25 |
| 1,500 | 4.75 |

Phenol is the preferred phenolic component used in the preparation of the highly reactive phenolic resins of this invention. However, the phenol may be replaced, in whole or in part, with a methylene bisphenol, e.g., 4,4'-methylene bisphenol, 3,3'-methylene bisphenol, etc., with equivalent results. For the purposes of this invention, 0.5 mol of a methylene bisphenol is equivalent to 1 mol of phenol. Similarly, up to 15% by weight of the phenol may be replaced with other phenolic compounds such as the cresols, xylenols and certain polyphenyl phenols which occur in still bottoms in the distillation purification of phenol and vanillin.

The formaldehyde employed may be substantially pure or it may be a commercially available aqueous solution thereof. For practical reasons, Formalin, a 37% aqueous formaldehyde, is usually employed. Commercial Formalin usually contains a small proportion of methanol to stabilize the formaldehyde against polymerization to paraformaldehyde in storage or in transit. Methanol-free Formalin is available and may be used. However, up to about 6% methanol by weight, based upon the total weight of the Formalin, may be present. At higher methanol content, the reactivity of the formaldehyde rapidly decreases, resulting in excessive reaction times in attaining each desired end-point during the reaction. From 2.1 to 3.25 mols of formaldehyde per hydroxyl equivalent of the phenol may be used; that is, from 2.1 to 3.25 mols per mol of phenol or per 0.5 mol of methylene bisphenol. However, in a preferred embodiment, from about 2.25 to 3.0 mols of formaldehyde per hydroxyl equivalent of the phenol have been found to provide better reactivity, all other parameters being equal. When a mixture of phenols is employed, the overall hydroxyl equivalent thereof should be determined.

The alkali metal hydroxide employed may be lithium hydroxide, sodium hydroxide, potassium hydroxide, rubidium hydroxide, cesium hydroxide, or some mixture thereof. Generally, they are employed in aqueous solution. For economic reasons sodium hydroxide is preferred. The total alkali metal hydroxide employed ranged from 1.0 to 2.0 mols per hydroxyl equivalent of the phenol. The superior reactivity of the resins of this invention is attributed to the manner in which the alkali metal hydroxide is charged in a plurality of increments, each in critical proportions. The initial proportion of alkali metal hydroxide may vary from 0.3 to 0.6 mol per hydroxyl equivalent of the phenol but the exact proportion chosen should be selected so as to constitute from 12 to 20 mol percent of the total formaldehyde. The second addition of alkali metal hydroxide is restricted to an amount which when added to that initially charged does not exceed 0.8 mol per hydroxyl equivalent of the phenol. This second addition may be charged in one or more adds or even continuously; avoiding, however, exceeding the 0.8 mol per hydroxyl equivalent maximum and observing the viscosity criterion hereinafter specified. The remainder of the alkali metal hydroxide is then preferably added in one further addition, but may be divided, in varying proportions, into from 2 to 4 or more increments and added successively.

Water is added to the reaction mixture in a proportion sufficient to control the solids content of the final product so that no addition or removal of water is necessary at the end of the reaction. In calculating the amount of water to be added, the amount of water present in the Formalin and in the alkali metal hydroxide solutions should be taken into account. The final solids content may range from about 15 to 50% by weight depending upon the application; from about 35 to 45% solids by weight being most conventional in plywood adhesive application.

The addition of relatively small proportions of water and particularly of aqueous alkali metal hydroxide solutions has a severe thinning effect upon the reaction mixture. Thus, in the following discussion of the process and particularly of the several viscosity endpoints, it must be remembered that addition of the succeeding portion of alkali metal hydroxide after reaching a desired viscosity endpoint will thin the relatively viscous reaction mixture very considerably. For example it is not at all uncommon to observe drops in 70° F. viscosity on the MacMichael #26d scale from a level of e.g., 900 to a new level of, e.g., 15 or less on adding the second portion of alkali metal hydroxide. The reaction mixture must then be bodied up again to the next critical endpoint.

The order of addition of the various ingredients and the reaction conditions are critical. The reaction should be carried out in several steps, as follows:

The first step comprises combining the phenol, formaldehyde, water and initial alkali metal hydroxide in the previously prescribed proportions, having special regard to the criticality of the proportion of the alkali metal hydroxide with respect to both the phenol and the formaldehyde. Gentle heating is sufficient to start the reaction which is so exothermic that it rapidly increases the temperature to reflux, i.e., about 215° F. If the exotherm is too rapid, or if a lower reaction temperature is desired, cooling or vacuum reflux may be used to control the reaction. Temperatures of from 160° F., and more preferably 190° F., to reflux may be employed, maintaining such temperature for from 15 to 45 minutes.

In the second step, the reaction mixture is adjusted to a temperature of from 140 to 180° F. and maintained thereat until the first viscosity endpoint, i.e., from about 100 to 50,000 MacMichael #26d units at 70° F., is reached. This is determined by periodically sampling the reaction mixture, cooling the sample to 70° F., and measuring the viscosity. If desired, higher reaction temperatures up to reflux may be employed in conjunction with the greater control afforded using a continuous viscosity measuring system.

The third step comprises adding the second portion of the alkali metal hydroxide, being careful not to exceed the maximum limit of 0.8 mol of total alkali metal hydroxide per hydroxyl equivalent of the phenol. As heretofore stated, this addition of alkali metal hydroxide may be made in one add, in several increments, or even continuously. This addition may be accompanied by a rapid rise in temperature and a drastic decrease in viscosity. Cooling may be applied if desired.

In that embodiment where the second portion of the alkali metal hydroxide is charged all at once in one add, the fourth step comprises maintaining the reaction mixture at a temperature of from 140 to 180° F. until the second viscosity endpoint of from 50 to 250 MacMichael #26d units at 70° F. is reached. Again, temperatures up to reflux may be employed in conjunction with continuous viscosity measurement.

On the other hand, in those embodiments where the second portion of the alkali metal hydroxide is charged in two or more increments or continuously, the reaction may be run at a temperature of from about 140° F. to reflux and at a 70° F. viscosity of up to about 5000 MacMichael #26d units between each increment.

The fifth step comprises adding, all at once, incrementally, or continuously over a period of time, the remainder of the alkali metal hyroxide to the reaction medium. This addition may also be accompanied by a temperature rise and a considerable decrease in viscosity. In one embodiment of this invention, this portion of the alkali metal hydroxide may be divided into up to 4 or more portions, of varying or uniform proportions, and added incrementally to the reaction. If the incremental embodiment is followed, the reaction mixture is heated as in step 4 to 70° F. viscosity endpoints of from 25 to 150 MacMichael #26d units between each incremental addition.

In an optional sixth step the reaction mixture is maintained after the last alkali metal hyroxide has been added at a temperature of from 175 to 190° F. until a final viscosity endpoint of from 25 to 150 MacMichael #26d units at 70° F. is reached. Here again, temperatures up to reflux may be employed in conjunction with continuous viscosity measurement.

The seventh and final step is a rapid reduction in temperature to about room temperature to terminate the reaction. Cooling water or vacuum reflux, or both, may be used to accomplish proper cooling.

The highly reactive aqueous aklaline phenolic resins of this invention may be combined with conventional additives in the formulation of low-cost, high-speed adhesives for the manufacture of plywood, laminated wood, hardboard and chipboard. Such conventional additives include filler, soda ash, soluble silicates, ammonia, catalytic agents, defoamers, hardeners, buffer salts, dyes, etc., to provide special adhesive compositions particularly adapted for use in given applications. Similarly, materials such as carboxymethyl cellulose, hydroxyethyl cellulose, polyelectrolytes, polyolefins, polyesters, etc., may be added for control of flow, i.e., spreadability and viscosity. These resins also make excellent adhesives for paper, cardboard, cloth, etc., bonding such materials to themselves, to each other, or to wood. In use, these adhesives may be applied either directly as liquids, or indirectly on a wet or dry self-supporting film.

The resins of this invention may also be combined with conventional protein adhesive compositions as viscosity controlling agents, consistency modifiers, or mold inhibitors.

It is obvious that many variations may be made in the products and processes set forth above without departing from the spirit and scope of this invention.

What is claimed is:

1. A process for preparing a condensation product in aqueous alkaline medium which comprises (a) initially contacting 1 hydroxyl equivalent proportion of a phenol selected from the group consisting of phenol, methylene bisphenols, and mixtures thereof, with from 2.1 to 3.25 molar proportions of formaldehyde and from 0.3 to 0.6 molar proportion of an alkali metal hydroxide at a temperature of from 160° F. to reflux for from 15 to 45 minutes, the relative proportion of alkali metal hydroxide being chosen so as to constitute from 12 to 20 mol percent based upon the formaldehyde, (b) adjusting the mixture to a temperature of from 140° F. to reflux and maintaining said temperature until a 70° F. viscosity of from 100 to 50,000 MacMichael #26d units is attained, (c) adding a further quantity of alkali metal hydroxide in a proportion such that the total alkali metal hydroxide in the mixture is no more than 0.8 molar proportion per hydroxyl equivalent porportion of the phenol while maintaining the mixture at a temperature of from 140° F. to reflux until a 70° F. viscosity of from 25 to 5000 MacMichael #26d units is attained, (d) adding in from 1 to 4 further increments sufficient alkali metal hydroxide to raise the total alkali metal hydroxide in the mixture to from 1.0 to 2.0 molar proportions per hydroxyl equivalent proportion of the phenol, heating the mixture at a temperature of from about 140° F. to reflux to attain 70° F. viscosities of from 25 to 150 MacMichael #26d units between each incremental addition and (e) rapidly cooling the mixture to room temperature.

2. A process as in claim 1 wherein the mixture is heated at a temperature of from 140° F. to reflux following addition of the last increment of alkali metal hydroxide until a 70° F. viscosity of from about 25 to 150 MacMichael #26d units is attained and then rapidly cooling the mixture to room temperature.

3. A process for preparing a condensation product in aqueous alkaline medium which comprises (a) initially contacting 1 hydroxyl equivalent proportion of a phenol selected from the group consisting of phenol, methylene bisphenols, and mixtures thereof, with from 2.1 to 3.25 molar proportions of formaldehyde and from 0.3 to 0.6 molar proportion of an alkali metal hydroxide at a temperature of from 160° F. to reflux for from 15 to 45 minutes, the relative proportion of alkali metal hydroxide being chosen so as to constitute from 12 to 20 mol percent based upon the fromaldehyde, (b) adjusting the mixture to a temperature of from 140° F. to reflux and maintaining said temperature until a 70° F. viscosity of from 100 to 50,000 MacMichael #26d units is attained, (c) adding a further quantity of alkali metal hydroxide in a proportion such that the total alkali metal hydroxide in the mixture is no more than 0.8 molar proportion per hydroxyl equivalent proportion of the phenol while maintaining the mixture at a temperature of from 140° F. to reflux until a 70° F. viscosity of from 50 to 250 MacMichael #26d units is attained, (d) adding sufficient alkali metal hydroxide to raise the total alkali metal hydroxide in the mixture to from 1.0 to 2.0 molar proportions per hydroxyl equivalent proportion of the phenol, (e) heating the mixture at a temperature of from about 140° F. to reflux until a 70° F. viscosity of from 50 to 250 MacMichael #26d units is attained and (f) rapidly cooling the mixture to room temperature.

4. A process for preparing a condensation product in aqueous alkaline medium which comprises (a) initially contacting 1 molar proportion of phenol with from 2.1 to 3.25 molar proportions of formaldehyde and from 0.3 to 0.6 molar proportion of sodium hydroxide at a temperature of from 190° F. to reflux for from 15 to 45 minutes, the relative proportion of sodium hydroxide being chosen so as to constitute from 12 to 20 mol percent based upon the formaldehyde, (b) adjusting the mixture to a temperature of from 140 to 180° F. and maintaining said temperature until a 70° F. viscosity of from 100 to 50,000 MacMichael #26d units is attained, (c) adding a further quantity of sodium hydroxide in a proportion such that the total sodium hydroxide in the mixture is no more than 0.8 molar proportion per molar proportion of phenol, (d) maintaining the mixture at a temperature of from 140 to 180° F. until a 70° F. viscosity of from 50 to 5000 MacMichael #26d units is attained, (e) adding in from 1 to 4 further increments sufficient sodium hydroxide to raise the total sodium hydroxide in the mixture to from 1.0 to 2.0 molar proportions per molar proportion of the phenol, (f) maintaining the mixture at a temperature of from 175 to 190° F. to attain 70° F. viscosities of from about 25 to 150 MacMichael #26d units between each incremental addition, and (g) rapidly cooling the mixture to room temperature.

5. A process as in claim 4 wherein the mixture is heated at a temperature of from 140° F. to reflux following addition of the last increment of alkali metal hydroxide until a 70° F. viscosity of from about 25 to 150 MacMichael #26d units is attained and then rapidly cooling the mixture to room temperature.

6. A process for preparing a condensation product in aqueous alkaline medium which comprises (a) initially contacting 1 molar proportion of phenol with from 2.1 to 3.25 molar proportions of formaldehyde and from 0.3 to 0.6 molar proportions of sodium hydroxide at a temperature of from 190° F. to reflux for from 15 to 45 minutes, the relative proportion of sodium hydroxide being chosen so as to constitute from 12 to 20 mol percent based upon the formaldehyde, (b) adjusting the mixture to a temperature of from 140 to 180° F. and maintaining said temperature until a 70° F. viscosity of from 100 to 50,000 MacMichael #26d units is attained, (c) adding a further quantity of sodium hydroxide in a proportion such that the total sodium hydroxide in the mixture is no more than 0.8 molar proportion per molar proportion of phenol, (d) maintaining the mixture at a temperature of from 140 to 180° F. until a 70° F. viscosity of from 50 to 250 MacMichael #26d units is attained, (e) adding sufficient sodium hydroxide to raise the total sodium hydroxide in the mixture to from 1.0 to 2.0 molar proportions per molar proportion of the phenol, (f) maintaining the mixture at a temperature of from 175 to 190° F. until a 70° F. viscosity of from about 25 to 150 MacMichael #26d units is attained, and (g) rapidly cooling the mixture to room temperature.

7. A process for preparing a condensation product in aqueous alkaline medium which comprises (a) initially contacting 1 molar portion of phenol with about 2.5 molar proportions of formaldehyde and about 0.375 molar proportions of sodium hydroxide at reflux temperature for from 15 to 45 minutes, (b) adjusting the mixture to a temperature of about 160° F. and maintaining said temperature until a 70° F. viscosity of from 100 to 50,000 MaMichael #26d units is attained, (c) adding about 0.3 molar proportion of sodium hydroxide, (d) maintaining the mixture at a temperature of about 160° F. until a 70° F. viscocity of from about 50 to 250 MacMichael #26d units is attained, (e) adding about 0.4 molar proportion of sodium hydroxide, (f) adjusting the mixture to a temperature of about 180° F. and maintaining said temperature until a 70° F. viscosity of from about 25 to 150 MacMichael #26d units is attained, and (g) rapidly cooling the mixture to room temperature.

8. A condensation product as prepared by (a) initially contacting 1 hydroxy equivalent proportion of a phenol selected from the group consisting of phenoy, methylene bisphenols, and mixtures thereof, with from 2.1 to 3.25 molar proportions of formaldehyde and from 0.3 to 0.6 molar proportion of an alkali metal hydroxide at a temperature of from 160° F. to reflux for from 15 to 45 minutes, the relative proportion of alkali metal hydroxide being chosen so as to constitute from 12 to 20 mol percent based upon the formaldehyde, (b) adjusting the mixture to a temperature of from 140° F. to reflux and maintaining said temperature until a 70° F. viscosity of from 100 to 50,000 MacMichael #26d units is attained, (c) adding a further quantity of alkali metal hydroxide in a proporion such that the total alkali metal hydroxide in the mixture is no more than 0.8 molar proportion per hydroxl equivalent proportion of the phenol while maintaing the mixture at a temperature of from 140° F. to reflux until a 70° F. viscosity of from 50 to 5000 MacMichael #26d units is attained, (d) adding in from 1 to 4 further increments sufficient alkali metal hydroxide to raise the total alka metal hydroxide in the mixture to from 1.0 to 2.0 molar proportions per hydroxyl equivalent proportion of the phenol, heating the mixture at a temperature of from about 140° F. to reflux to attain 70° F. viscosities of from 25 to 150 MacMichael #26d units between each incremental addition, and (e) rapidly cooling the mixture to room temperature.

References Cited by the Examiner
UNITED STATES PATENTS

| | | | |
|---|---|---|---|
| Re. 23,347 | 3/1951 | Redfern | 260—57 |
| 2,437,981 | 3/1948 | Stephan et al. | 260—57 |
| 2,675,336 | 4/1954 | Stephan | 260—57 |
| 3,108,990 | 10/1963 | Baxter | 260—29.3 |

MURRAY TILLMAN, *Primary Examiner.*

J. C. BLEUTGE, *Assistant Examiner.*

UNITED STATES PATENT OFFICE
CERTIFICATE OF CORRECTION

Patent No. 3,274,139                  September 20, 1966

Alan L. Lambuth

It is hereby certified that error appears in the above numbered patent requiring correction and that the said Letters Patent should read as corrected below.

Column 12, line 34, for "50 to 250" read -- 25 to 150 --.

Signed and sealed this 22nd day of August 1967.

(SEAL)
Attest:

ERNEST W. SWIDER
Attesting Officer

EDWARD J. BRENNER
Commissioner of Patents